2,995,246
CENTRIFUGAL SCREENING TYPE SEPARATOR AND METHOD
Marcel L. E. van Tittelboom, Sas van Gent, Netherlands, assignor to Corn Products Company, a corporation of Delaware
Filed Mar. 31, 1958, Ser. No. 725,359
Claims priority, application Netherlands Apr. 16, 1957
9 Claims. (Cl. 209—362)

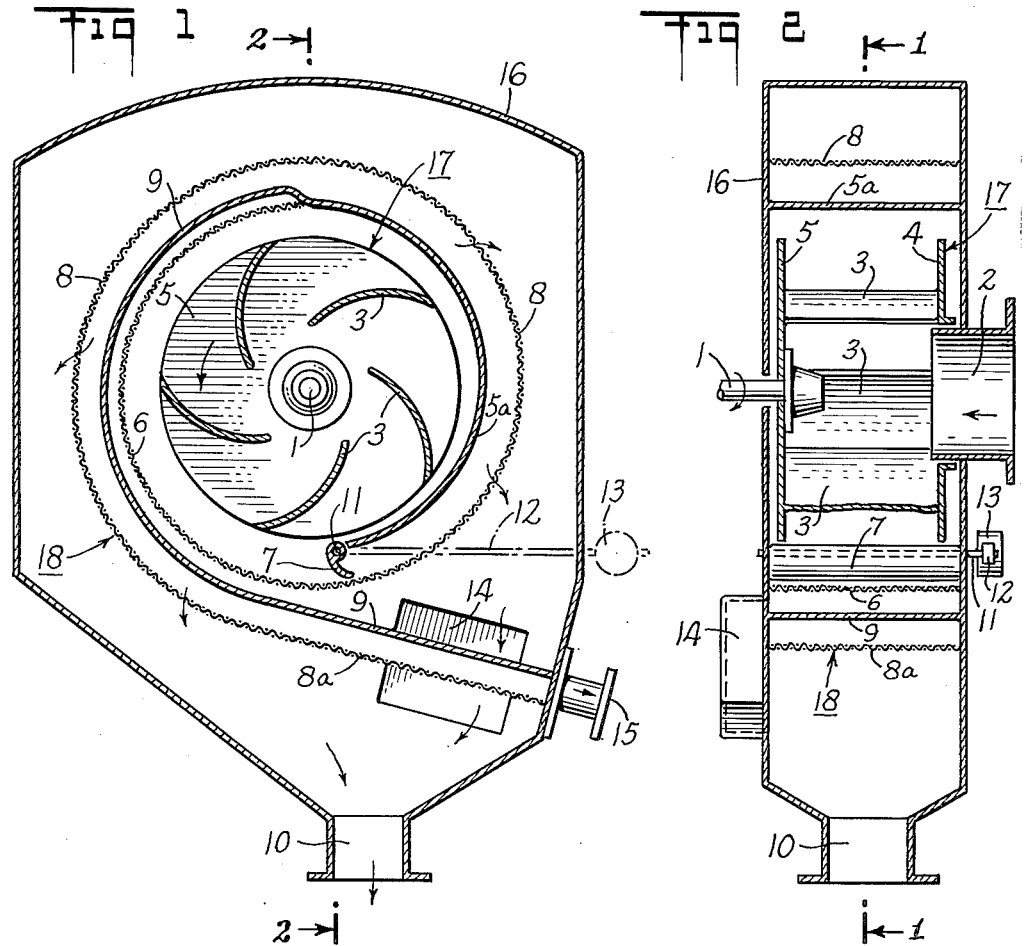
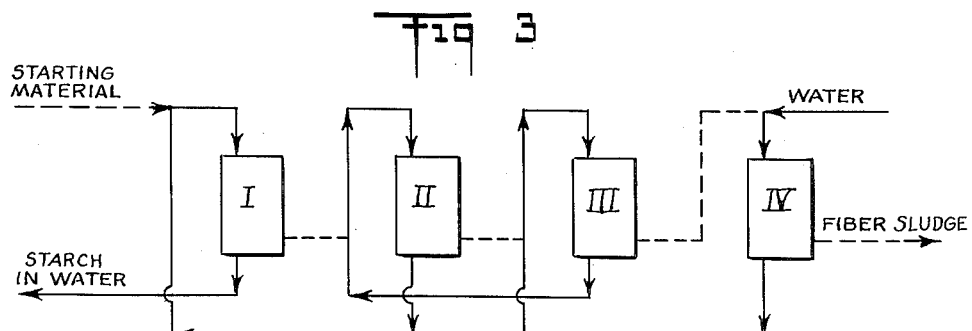

This invention relates to a centrifugal screening type separator which contains certain elements of a centrifugal pump, the latter part of the wall of the spiral casing of which consists of a screen, and a process in which such a separator is found useful.

Such a separator, in general, has been found to be suitable for washing or lixiviating slurries for the purpose of separating a given solid material from the rest of the fluid mixture, particularly where such material is smaller in particle size than the screen openings. Such a screen separator according to the present invention has been found to be particularly suitable for washing out starch granules from a mixture of starch granules and fiber, for example, from a slurry obtained when grinding soaked corn from which the germs have been removed, or from a slurry obtained from ground tapioca roots. The separator of the present invention is suitable for recovery of pulp in the paper industry, e.g., recovery of fiber from white water. Furthermore, it may be used to separate substances such as sugars from massecuites.

According to the classical method of separating starch from fibers, the starch is washed from a slurry of fibers and starch granules on shaking sieves with a large sieving surface. These require much space for their arrangement. By the use of sieving devices in which use is made of the centrifugal force developed by driving rotating sieves or a rotating mechanism at high speed, it has been possible to achieve a considerable saving of the space which is required for the arrangement of the classical sieving devices mentioned above. The known sieving devices with the rotating sieves or a rotating mechanism have the drawback, however, that they consume a great deal of power.

It has been found that when using a screening separator according to the present invention good results are obtained with a considerably less consumption of power than with application of the known sieving devices in which sieves or rotating mechanisms are used.

In the preferred embodiment of the centrifugal screening type separator according to the present invention, a controlling blade or governor is provided at the outlet side of the spiral casing, for example, at a distance of approximately 360° from the beginning of its wall by which blade a back pressure is exerted in the casing upon the screen. It is preferable to arrange this blade in such a manner that it is able to pivot. This may be achieved by arranging it on a rotatable shaft carrying a lever with counterweight by which the back pressure produced by the guiding blade may be controlled. This pivoted blade, moreover, has the advantage that it is free to move, permitting, for example, stones and the like to go through the device when such are present in the material displaced by the impeller of the device. Furthermore, it will automatically provide a larger passage when a larger volume of material is displaced by the impeller. This means consequently that varying amounts of material per unit of time may be treated in the same device with the same final result because the back pressure produced by the guiding blade is substantially independent of the volume of displaced material.

Preferably the entire second half of the first 360° of the wall of the spiral casing consists of a screen. If desired, a sliding wall may be arranged over this screen owing to which the length of the wall of the spiral casing acting as a screen may be varied.

In practice, it is preferred to elongate the first 360° of the wall of the spiral casing of the centrifugal pump, the latter part of which thus consists of a screen, by a screen extending over a distance of, for example, 360° as a spiral around the impeller. With this embodiment, it is possible to reduce the moisture content of the solid material even further.

The screens may be perforated plate sieves, or electrodeposited plate sieves, or so called screen bar sieves, or, preferably, slot sieves.

Now in order to acquaint those skilled in the art with the manner of constructing and operating a device according to my invention, I shall describe, in connection with the accompanying drawings, a specific embodiment of the same.

In the drawings:
FIGURE 1 is a vertical longitudinal section of the centrifugal screening separator of this embodiment on the line 1—1 of FIGURE 2;
FIGURE 2 is a vertical cross section taken on the line 2—2 of FIGURE 1;
FIGURE 3 is a diagrammatic layout of a separating system employing the separators of the present invention.

The centrifugal screening type separator according to FIGURES 1 and 2 is provided with a driving shaft 1, which is driven by a motor not shown, a central supply or intake connection 2, which is connected, for example, with a pump supplying the material to be treated. The curved impeller blades 3 are arranged between the two side plates 4 and 5 to form a closed type of impeller 17. A spiral casing, involute in form, indicated in its entirety by reference number 18, extends about the impeller 17 which rotates in the direction indicated by the arrow on FIGURE 1 when the device is in operation. Starting from the cutoff or part of the volute approaching nearest the periphery of the impeller, substantially the first 180° of the wall of the spiral casing of the separator are occupied by the closed wall 5a. The following 180°, however, are carried out as a screen 6 which continues past the control blade 7 as the spiral screen 8.

Between the wall 6, which consists of a screen, and the prolongation thereof in the form of the spiral screen 8, there is disposed an imperforate wall 9 which joins the imperforate part 5a of the wall of the spiral casing of the impeller.

The entire separator, including the extended parts 8 and 8a of the spiral screen, is enclosed in the casing 16 which is provided with an outlet 10 for the discharge of material which has passed through the screen.

The controlling blade 7 is pivotally mounted on the shaft 11. This shaft extends outside the casing 16 at the side of the intake connection 2 and carries a lever arm 12 with an adjustable counterweight 13 thereon.

The material to be treated, for example, a suspension of starch granules and fibers in water, is supplied through the intake 2, and it is thrown radially and circumferentially against volute wall 5a and screen 6 by operation of the revolving blades 3, whereby a large amount of the waterborne starch is separated from the fibers. The water, with the starch passing through the sieve, collects on the lower part of the stationary imperforate wall 9. The controlling blade 7 exerts a back or counter pressure on the fiber material and liquid remaining on the inside of the screen 6. Under the influence of the action of the impeller this material slides under the controlling blade 7 and circumferentially upward along the helical screen 8 where it is further dehydrated. The water with the starch driven along and collecting on the lower part of the stationary wall 9 is guided by way of the channel 14 around the wall 9 and below the lower part of the helical screen 8a where it combines with the liquid which has passed the left hand and lower part of the spiral screen 8. The solid fiber material carried along the screen is discharged through the discharge 15. If desired, it may be mixed with fresh water or starch slurry and supplied to another similar device as described below. The vane 7 being yieldingly urged toward closed position by the weighted lever arm 12 requires a predetermined fluid pressure to be impressed upon it before it will open. When it does so open, it allows only so much of the flow to pass as can occur without reducing the pressure on the inside of the vane 7. The pressure that acts on the vane also acts on the material on the screen 6 tending to drive it through the screen. The flow that is allowed to pass the vane sweeps the retained material along the surface of the screen and discharges it at the outlet 15.

The operation of the impeller and volute is a convenient way of developing pressure on the screen 6 and of assisting tangential flow in the charge of the material retained on the screen. The introduction of material to be treated and its pressure against the screen and against the valve may be brought about by other means. The use of the vane 7 or its equivalent for securing the desired proportioning of first a flow through the screen, and second, a flow discharged over the screen is an essential feature.

The position of the counterweight 13 along the lever 12 is adjustable to permit greater or less back pressure to be maintained in the impeller chamber, and particularly upon screen 6.

The impeller creates motion of the liquid slurry in the well known manner of a centrifugal pump, i.e., the liquid moves with a radial component of motion outwardly from the center to the periphery and with a component of rotary motion around the inside wall, particularly along the surface of the portion 6 of the screen anterior to the vane 7. Assuming a normal throughput of the starch-fiber slurry under the influence of the impeller 17 a greater retarding of flow by vane 7 will tend to force more of the liquid through the initial part of the screen, i.e., the part 6 anterior to the vane 7. The liquid discharged under the vane 7 moves tangentially of the screen. It will consist of a slurry carrying the retained fiber with reduced starch content because of what has been forced through the screen 6 ahead of vane 7. Now by regulating the loading of the vane or valve 7 a greater or less proportion of the liquid is forced through the screen, carrying starch with it, and a corresponding less or greater proportion of the liquid carrying the fiber will be caused to flow out under the vane or valve 7 and along the surface of the screen 8 beyond said valve. Said screen beyond the vane or valve 7 will continue to retain the fiber and sufficient liquid to carry the same along in a moving current while allowing starch and further liquid to pass through the screen and to the starch outlet 10.

As already mentioned above, the centrifugal screen type separator is especially suited for separating starch from a mixture of starch and fibers, as obtained, for example, from the wet-milling of corn.

When the starch is separated from a mixture of starch and fibers, it is preferred to arrange a number of centrifugal screen type separators, one behind the other, and to pass the material to be separated therethrough in counter-current fashion with a flow of water. Thus, the filtrate (water and starch, if any) coming from a centrifugal screen type separator is mixed with a fiber sludge coming from the preceding screen pump and the mixture supplied to the next screen pump.

*Example*

A plant consisting of the centrifugal screen type separators constructed as above described was used for separating the starch from a sludge obtained by wet-grinding soaked corn after removal of the germs. The starting product had a content of dry substance of 24 percent, while 76 percent of the dry substance consisted of starch.

The four centrifugal screen type separators which were used each had a casing width of 150 mm. and a sieving surface of 45 dm.$^2$. The diameter of the impeller or fan in each separator amounted to 200 mm. while the spiral screen had a smallest diameter of 270 mm. and a largest diameter of 450 mm.

The manner in which the four centrifugal screen type separators I, II, III and IV were connected as indicated in the diagram of FIGURE 3. By the full lines, the displacement of the water by the various separators is indicated and by the dotted lines the displacement of the fiber material.

The starting material was mixed with the starch-containing water which had been passed through the screen of separator II and the suspension thus obtained was supplied to separator I. The material retained by the screen of separator I was mixed with the starch-containing water which had been passed by the screen of separator III, etc. To separator IV a mixture of fresh water and the fiber sludge of separator III was supplied.

With this plant 16,850 kg. of starting material of the above-mentioned composition were treated per hour. Per hour, 39,800 liters of fresh pure water were supplied to the separator IV.

After the first separator 50 percent of the dry substance still consisted of starch; after the second separator 33 percent; and after the third 21 percent.

The fiber sludge leaving separator IV had a content of dry substance of 8 percent. Only 15 percent of the dry substance consisted of starch.

The impellers of the centrifugal screen type separators in the above mentioned plant made 1450 revolutions per minute, and were each directly driven by a motor of 7 H.P.

I claim:

1. In a device of the class described, a rotatable impeller, a casing enclosing the impeller and having an inlet opening communicating with the impeller, a curved screen in the casing, said screen having its concave side facing the periphery of the impeller and having its convex side exposed to the inside of said casing, said casing having an outlet communicating with the convex side of the screen for discharge outside the casing of material which has passed through the screen, said casing also having an outlet communicating with the concave side of the screen and leading to the outside of the casing for the discharge of material which does not pass through the screen, a hinged vane disposed transversely of the flow of material along the concave surface of said screen to obstruct said flow, said vane being opened by the pressure of said material on the concave side of the screen, and means for yieldingly opposing the opening movement of said vane in order to retain a desired fluid pressure on the concave side of the screen.

2. The device of claim 1 further characterized by the means for yieldingly opposing the opening movement of said vane, comprising an arm connected to the vane, said arm having an adjustable weight.

3. The device of claim 1 further characterized by the curved screen being disposed in the form of a spiral extending through more than 360° around the circumference of the impeller, there being a cutoff for the impeller at which said vane is hinged, the free edge of the vane when the vane is in closed position being disposed substantially tangent to the concave surface of the screen and being adapted to be moved toward open position by the pressure of the liquid driven by the impeller against the concave side of the screen ahead of said cutoff point.

4. In a device of the class described, a rotatable impeller, a casing enclosing said impeller and having an inlet axially of said impeller, said casing having two discharge outlets, a volute about said impeller comprising a spirally disposed screen the convex side of which is in communication with the inside of the casing and with the first discharge outlet, an imperforate wall joined at one end to said screen and spaced laterally therefrom to provide a discharge passageway leading to the second outlet, a loaded flow retarding valve for controlling said discharge passageway for holding a predetermined pressure of liquid in said volute upon the concave side of said screen.

5. In a device of the class described, a casing having an inlet opening for the impeller, and having two outlets, an impeller in said casing, an imperforate curved wall disposed in said casing in a spiral of more than 180° about the impeller, said wall having its inner end disposed near the periphery of the impeller and constituting a cutoff, a curved screen wall having its inner end joined to said imperforate wall and being spaced laterally from said imperforate wall to form a spiral passageway on the concaved side of the screen throughout its length, said screen being disposed in a spiral of more than 180° and a yielding flow restriction disposed in said passageway between the cutoff and the screen to produce a back pressure ahead of the cutoff while permitting the passage therethrough of solids retained on the screen, one of said outlets communicating with the said passageway for discharging said solids retained on the screen, and the other of said outlets communicating with the convex side of the screen for discharge of the material that has passed through the screen.

6. The combination of claim 5 wherein the inner end of the spiral screen joins the imperforate wall at an angular distance about the impeller of approximately 180° from the cutoff.

7. A centrifugal screening type separator comprising a volute having an axial inlet connection and a discharge connection, a rotatable impeller in said volute cooperating therewith to discharge liquid therefrom, a part of the wall of the volute being made of screen, a back pressure producing valve in said discharge connection, said valve being yieldably loaded to present a yielding obstruction to flow of liquid therethrough while allowing the discharge of material retained on the screen.

8. The method of separating solids from a solids-fibre slurry, which comprises delivering the slurry to a central area, centrifugally projecting the slurry outward radially from said area onto a screen thereby separating the solids in major portion from the fibre and forming upon the screen a fibre mat, advancing the mat along the screen to and through an outlet in opposition to yielding pressure effective for maintaining the mat of substantially constant thickness and for diverting the liquid component of the slurry away from the screen, centrifugally projecting onto the screen under increased centrifugal pressure the liquid component diverted from the outlet, and separately discharging the separated out fibre and the separated out liquid and solid components of the slurry.

9. The method of separating starch granules from a starch-fibre slurry, which comprises delivering the slurry to a rotating centrifugal impeller axially thereof, centrifugally projecting the slurry outward radially of the impeller radially thereof onto a screen defining with the impeller a space increasing in extent radially of the impeller toward an outlet and thereby separating the starch granules in major portion from the fibre and forming upon the screen a fibre mat, advancing the mat over the screen to and through the outlet while yieldingly opposing passage of the mat through the outlet and thereby maintaining the mat under substantially constant pressure and at a substantially constant desired thickness, diverting the liquid component of the slurry from the outlet to the impeller and thereby again projecting it onto the screen under further and increased centrifugal pressure, and separately discharging the separated out fibre and the separated out starch granules and liquid component of the slurry.

References Cited in the file of this patent

UNITED STATES PATENTS

| | | |
|---|---|---|
| 572,548 | Kelley | Dec. 8, 1896 |
| 757,778 | Schrader | Apr. 19, 1904 |
| 845,044 | Baldwin | Feb. 26, 1907 |
| 911,802 | Baldwin | Feb. 9, 1909 |
| 1,386,548 | Blackmon | Aug. 2, 1921 |
| 1,675,200 | Smith | June 26, 1928 |
| 2,658,618 | Vogel | Nov. 10, 1953 |
| 2,833,413 | Fontein | May 6, 1958 |

FOREIGN PATENTS

| | | |
|---|---|---|
| 546,647 | Belgium | Apr. 14, 1956 |